United States Patent [19]

Lipski

[11] Patent Number: 5,046,466

[45] Date of Patent: Sep. 10, 1991

[54] SPARK-IGNITION ENGINE

[76] Inventor: Frank F. Lipski, 14634 Fonseca St., La Mirada, Calif. 90638

[21] Appl. No.: 585,497

[22] Filed: Sep. 20, 1990

[51] Int. Cl.$^5$ .............................................. F02P 15/08
[52] U.S. Cl. .............................. 123/310; 123/169 MG
[58] Field of Search ........ 123/310, 169 EL, 169 MG, 123/638; 313/123, 140

[56] References Cited

U.S. PATENT DOCUMENTS

| Re. 30,426 | 11/1980 | Haslett | 123/143 B |
|---|---|---|---|
| 1,780,076 | 10/1930 | Headen et al. | 123/145 R |
| 2,775,234 | 12/1956 | Smits . | |
| 2,904,610 | 9/1959 | Morrison . | |
| 2,948,824 | 8/1960 | Smits . | |
| 4,075,420 | 2/1978 | Walton | 174/117 F |
| 4,330,732 | 5/1982 | Lowther . | |
| 4,393,687 | 7/1983 | Müller et al. . | |
| 4,436,068 | 3/1984 | Nakamura et al. | 123/310 |
| 4,470,392 | 9/1984 | Yoshinaga et al. | 123/310 |
| 4,525,140 | 6/1985 | Larigaldie et al. | 123/169 EL |
| 4,535,735 | 8/1985 | Yoshinaga et al. | 123/310 |

FOREIGN PATENT DOCUMENTS 148022 9/1982 Japan .
1203125 8/1970 United Kingdom .

*Primary Examiner*—Tony M. Argenbright
*Attorney, Agent, or Firm*—Sheldon & Mak

[57] ABSTRACT

A spark-ignition engine is disclosed that incorporates a relatively unlimited number of spark sources within each combustion chamber, without conventional spark plugs being required. The engine includes a planar circuit module clampingly located between a cylinder assembly and a head assembly of the engine. The module includes an electrically insulative substrate; a pair of electrode members; a foil circuit on the substrate for connecting the electrode members to a pulser that generates a high voltage intermittent electric signal for producing spark ignition of the fuel within a combustion chamber of the engine; first and second seals for connecting the substrate to the cylinder assembly and the head assembly. Also disclosed is a kit for replacing spark plugs in an internal combustion engine, the kit including the circuit module and in one version, injector assemblies for use in place of the spark plugs.

32 Claims, 1 Drawing Sheet

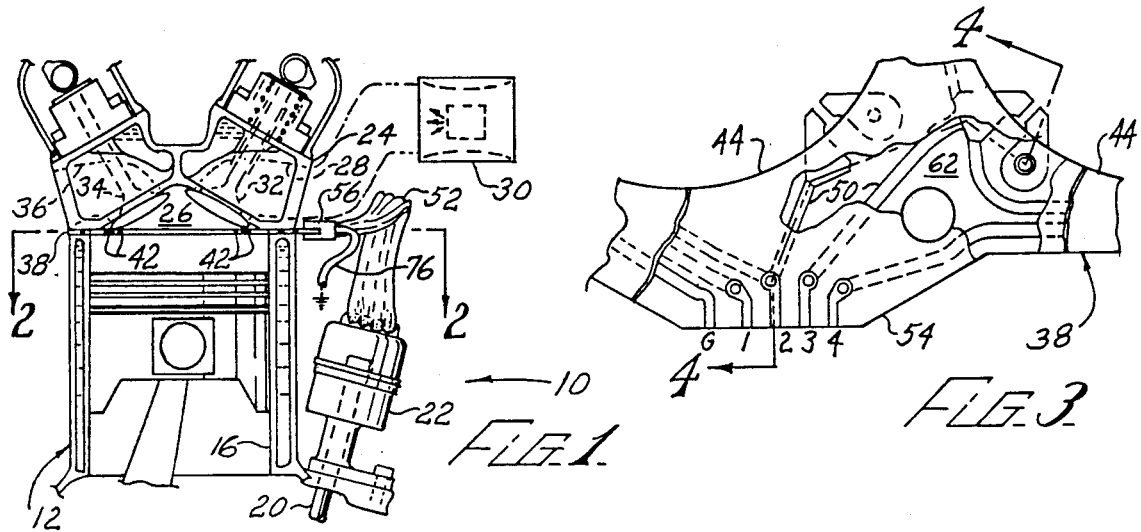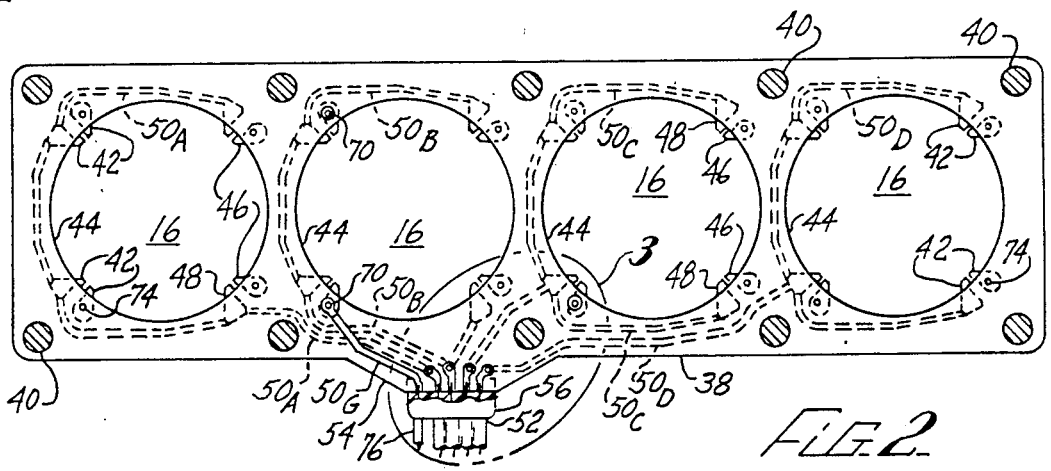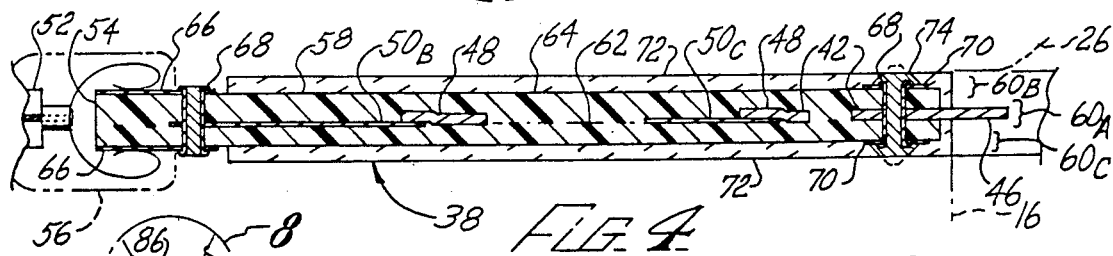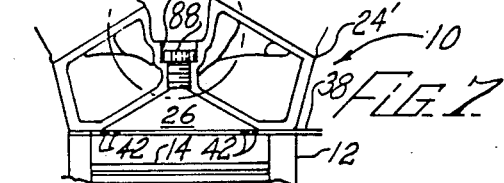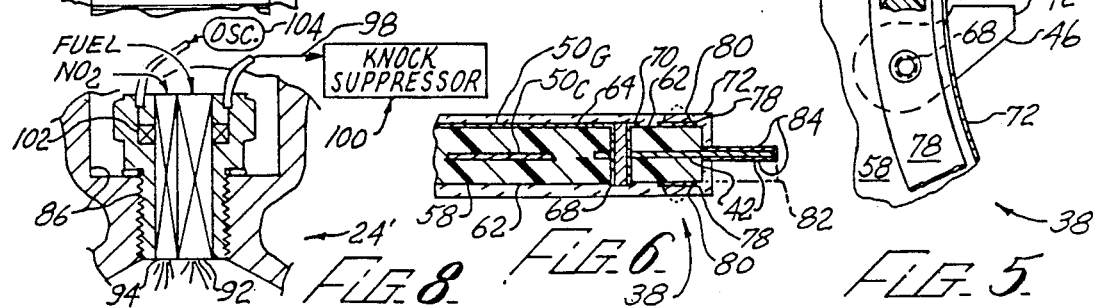

5,046,466

SPARK-IGNITION ENGINE

BACKGROUND

The present invention relates to spark-ignition internal combustion engines such as engines that typically power vehicles and other machinery using gasoline or similar fuel.

Spark-ignition internal combustion engines have moderate compression ratios, combustion being initiated by electric arcing rather than by charge heating as in Diesel engines. Spark-ignition engines are less expensive to produce and provide higher specific power output than Diesel engines, being also quieter and smoother running. However, a major shortcoming of conventional spark-ignition engines is the need for spark plugs, which are expensive to produce and often break down, requiring replacement. Aside from this obvious disadvantage, there are other disadvantages with spark-ignition engines. For example:

1. The combustion chamber is difficult to cool because of the close proximity of one or more spark plugs with intake and exhaust ports and associated valve train components;
2. Breathing efficiency is limited by valve area, which is in turn limited by the space taken up by the spark plugs;
3. Other openings in the combustion chamber, such as for injector nozzles and the like, are difficult to provide because of the competing need for spark plug openings;
4. Combustion is inefficient and accompanied by the production of unwanted atmospheric pollutants because ignition originates only from the locations of one or at most a pair of spark plugs per cylinder; and
5. The engines are expensive to produce because of the complicated tooling required to form the combustion chamber with adequate provisions for cooling in the presence of valving and spark plugs that are in close proximity.

Others have attempted to avoid some of these difficulties by locating spark electrodes about the circumference of each cylinder, using conductors imbedded within a head gasket or in specially provided cylinder rings. See, for example, Smits U.S. Pat. Nos. 2,775,234 and 2,948,824, Morrison U.S. Pat. Nos. 2,904,610, and Lowther U.S. Pat. No. 4,330,732. Unfortunately, none of these methods are believed to be commercially successful in that they require unconventional engine layout, excessive head gasket thickness, etc., and/or they are excessively expensive to produce, unreliable and short-lived.

Thus there is a need for a spark-ignition engine that does not require conventional spark plugs, that is inexpensive to produce, relatively free from the production of atmospheric pollutants, reliable, durable and easy to maintain.

SUMMARY

The present invention is directed to a spark-ignition engine that meets this need, incorporating a relatively unlimited number of spark sources within each combustion chamber, without conventional spark plugs being required. In one aspect of the invention, the engine includes cylinder means having at least one piston movable therein; head means for forming a combustion chamber in fluid communication with the piston, the head means being removably connected to the cylinder means; gas flow control means whereby intake air is admitted into the combustion chamber for compression by the piston and subsequently expelled from the combustion chamber as exhaust gas by the piston; fuel flow means for controllably admitting fuel into the combustion chamber, the fuel being mixed with the intake air; pulse means for generating a high voltage intermittent electric signal, the signal being synchronized with movement of the piston; and a planar circuit module clampingly located between the cylinder means and the head means, the module including an electrically insulative substrate; a pair of electrode members; circuit means on the substrate having foil conductor members for connecting the electrode members to the pulse means for producing spark ignition of the fuel within the combustion chamber; first seal means for sealingly connecting the substrate to one of the cylinder means and the head means; and second seal means for sealingly connecting the substrate to the other of the cylinder means and the head means. As used herein, "foil" means a material having a thickness of less than approximately 0.010 inch. The foil conductor members advantageously permit the circuit module to be made sufficiently thin to be used directly in place of a conventional head gasket.

The circuit module can have a plurality of the pairs of electrode members, and each pair can include a first electrode member and a second electrode member, the electrode members being located in a plane. The foil conductor members can form a circuit layer of the circuit module, the circuit means also having an insulating material for electrically isolating at least one of the first and second electrode members from the cylinder means and the head means.

Preferably the electrode members are formed integrally with the conductor members for facilitating fabrication of the module by low-cost electronic production methods. The insulative substrate is typically formed with an opening therein between the combustion chamber and the piston, the electrode members being supportively connected to the substrate and preferably extending into the opening for promoting effective charge ignition without deleterious ionization of the substrate. Preferably the electrodes are covered with a plated conductive coating substantially covering the portions of the electrodes that extend into the opening for enhanced durability of the module at high combustion temperatures. The conductive coating can include nickel or platinum.

The engine can be multi-cylindered, the cylinder means having a plurality of pistons, the head means including a corresponding plurality of combustion chambers, the circuit module preferably having a plurality of the pairs of electrode members in association with each of the combustion chambers for enhanced combustion efficiency. At least one electrode of each pair of the electrodes associated with each cylinder can be electrically isolated from the electrodes of the other cylinders for sequential charge ignition in the respective cylinders. The electrode pairs for each combustion chambers can be connected in parallel.

Preferably the insulative substrate is formed with an opening therein between the combustion chamber and the piston for supportively connecting the electrode members to the substrate and extending into the opening. The engine can also include means for electrically connecting one of the electrodes to at least one of the cylinder means and the head means by the clamped location of the circuit module therebetween.

Preferably an insulative coating forms the first seal means for enhancing the electrical isolation of the conductor members from grounded parts of the engine. The insulative coating can include fibrous ceramic. The first seal means can further include a metallic ring member rigidly and sealingly connected to the substrate, the ring member being deformed by the clamping between the cylinder means and the head means. The ring member can include a bead portion and a trace portion for forming a circuit layer portion of the circuit module and providing a base for the bead portion.

The engine can further include a plug opening into the combustion chamber from outside the head means of the type for receiving a spark plug, and a plug member for sealingly closing the plug opening. Preferably the plug member includes main injector means for feeding the fuel into the combustion chamber. The plug member can also include auxiliary injector means for feeding an auxiliary fluid into the combustion chamber and strain sensor means for providing a strain signal for indicating fluid pressure within the combustion chamber.

In another aspect of the present invention a kit is provided for replacing spark plugs in an internal combustion engine having a cylinder assembly having at least one piston movable therein, a head assembly removably connected to the cylinder assembly and forming a combustion chamber in fluid communication with the piston, a gas flow controller admitting intake air into the combustion chamber for compression by the piston and subsequently expelling the air from the combustion chamber as exhaust gas by the piston, a fuel flow controller for admitting fuel mixed with the intake air into the combustion chamber, and a pulser for generating a high voltage intermittent electric signal synchronized with movement of the piston. The kit includes one plug member for sealingly replacing each spark plug of the engine, and a planar circuit module for clamping between the cylinder assembly and the head assembly, the module including an electrically insulative substrate; a pair of electrode members; circuit means on the substrate for connecting the electrode members to the pulser for producing spark ignition of the fuel within the combustion chamber; first seal means for sealingly connecting the substrate to one of the cylinder assembly and the head assembly; and second seal means for sealingly connecting the substrate to the other of the cylinder assembly and the head assembly. The plug member can provide one or more injector units, a pressure sensor, and/or ultrasonic transducer for promoting enhanced combustion.

DRAWINGS

These and other features, aspects, and advantages of the present invention will become better understood with reference to the following description, appended claims, and accompanying drawings, where:

FIG. 1 is a partial sectional elevational view of a spark-ignition internal combustion engine according to the present invention;

FIG. 2 is a sectional plan view of the engine of FIG. 1 on line 2—2 thereof;

FIG. 3 is a detail plan view of the engine of FIG. 1 within region 3 of FIG. 2;

FIG. 4 is a fragmentary sectional elevational view of the engine of FIG. 1 on line 4—4 in FIG. 3;

FIG. 5 is a fragmentary sectional plan view as in FIG. 2, showing an alternative configuration of the engine of FIG. 1;

FIG. 6 is a sectional elevational detail view within region 6 of FIG. 4, showing another alternative configuration of the engine of FIG. 1;

FIG. 7 is a sectional elevational view as in FIG. 1 showing an alternative configuration of the engine; and FIG. 8 is sectional detail view within region 8 of FIG. 7, showing a further configuration of the engine of FIG. 1.

DESCRIPTION

The present invention is directed to a spark-ignition internal combustion engine that avoids the use of conventional spark plugs. With reference to FIGS. 1-4 of the drawings, an engine 10 has a block or cylinder assembly 12 having one or more pistons 14 slidably movable within corresponding cylinders 16, the pistons 14 being operatively connected to a conventional crankshaft (not shown). The crankshaft is geared directly or indirectly to a distributor shaft 20 of an ignition distributer 22. A cylinder head 24 covers the cylinder assembly 12, the head 24 having a plurality of combustion chambers 26 formed therein, each of the combustion chambers 26 having an associated intake port 28, fuel feed means 30, intake valve 32, exhaust valve 34, and exhaust port 36.

According to the present invention, a circuit module 38 that is clamped between the head 24 and the cylinder assembly 12, by conventional head bolts 40 or the like, incorporates a plurality of electrode members 42 therein, the electrode members 42 extending within one or more cylinder openings 44 of the module 38, each of the openings 44 corresponding to one of the cylinders 16. In an exemplary configuration of the module 38 as shown in the drawings, the electrode members 42 are arranged in pairs, each pair including a ground electrode 46 and a hot electrode 48. As shown in FIG. 2, the module 38 also incorporates a plurality of foil conductor traces 50 for electrically connecting the hot electrodes 48 through a wiring harness 52 to the distributor 22. For this purpose, the module 38 includes an edge plug portion 54 that mates with an edge socket assembly 56 of the harness 52, the edge plug portion 54 extending from between the cylinder assembly 12 and the head 24. As also shown in FIG. 2, a multiple cylinder configuration of the module 38 typically has separate and isolated conductive paths to the hot electrodes 48 for each cylinder 16 of the engine 10, the traces 50 being designated $50_A$, $50_B$, $50_C$, and $50_D$, respectively, for corresponding ones of the cylinders 16. Further multiple pairs of the electrodes 42 are spaced about each of the openings 42 for enhancing engine efficiency and reducing undesirable exhaust pollution by providing multiple spark sources. Moreover, the location of the electrodes 42 proximate the outer extremities of the combustion chambers 26 avoids pre-ignition and/or detonation by providing the spark sources closest to regions most subject to preignition and/or detonation.

As best shown in FIGS. 3 and 4, the module 38 includes a substrate 58 and one or more circuit layers 60, designated $60_A$, $60_B$, and $60_C$ in FIG. 4. The circuit layers 60 form a printed circuit that includes the foil conductor traces 50, the layers 60 extending between the cylinder assembly 12 and the head 24. As used herein, the term "printed circuit" means a foil conductive pattern that is formed on an insulative substrate by graphical means such as by selective plating or etching of a conductive material, and includes but is not limited to single and multi layer circuit boards. The term "foil" means a material having a thickness of less than approximately 0.010 inch. As shown in FIG. 3, the circuit layer $60_A$ is formed on a first substrate layer 62 of the substrate 58, a second substrate layer 64 being fused or otherwise formed on the first substrate layer 62, in a conventional manner known to those skilled in multi-layer printed circuit fabrication, for electrically insulating the circuit layer $60_A$ within the substrate 58.

A material suitable for use forming the substrate 58 is commercially available as FR4 fire retardant polymer. Typically, the traces 50 are formed as etched and/or plated copper.

In an exemplary configuration of the module 38 as depicted in FIGS. 1-4, the electrodes 42 are formed as discrete members that are bonded within the substrate 58, in electrical contact with the respective circuit traces 50. The electrodes 42 can be formed or stamped from a suitable high-temperature material such as nickel, platinum or tungsten. The circuit traces 50 extend within the plug portion 54, each trace 50 being electrically connected to a plurality of finger traces 66 that extend on opposite sides of the plug portion 54, by means of a feed-through 68, the feed-through 68 being formed by a conventional plated-through hole, an eyelet or the like. Likewise, the ground electrodes 46 are each electrically connected to one or a pair of ground pads 70 that are formed on outside surfaces of the substrate 58, by a counterpart of the feed-through 68.

The module 38 is also formed to include a pair of outside layers 72 for sealingly connecting the head 24 to the cylinder assembly 12 when the parts are clamped together by the head bolts 40. Preferably the outside layers 72 are formed of an electrically insulating material for enhancing the electrical isolation of the traces $50_{A-D}$ from each of the cylinder assembly 12 and the head 24. A suitable material for the outside layers 72 is a fibrous ceramic, which is known and commercially available for use as a high-temperature sealant.

As further shown in FIG. 4, the feed-throughs 68 are typically filled with solder, the solder associated with the grounded electrodes 46 being formed as button members 74, the button members 74 extending initially outside of the outside layers 72 for contacting the cylinder assembly 12 and the head 24. When the module 38 is assembled in the engine 10, the button members 74 become flattened flush with the outside layers 72.

As further shown in FIGS. 1-3, the conductor traces 50 include a ground trace, designated $50_G$, for electrically connecting the ground electrodes 46 to an external ground through a ground lead 76 of the wiring harness 52. The trace $50_G$ provides a convenient ground return from the module 38 during testing, either before or after the module 38 is installed in the engine 10. Another use for the trace $50_G$ is as a ground return to the distributor 22 (or other ignition circuit component) that is independent of a conventional chassis or engine ground, such as for avoiding certain ground current paths in a vehicle powered by the engine 10.

With further reference to FIG. 5, an alternative configuration of the module 38 has one or more ring traces 78 that form portions of the ground trace $50_G$ and at least some of the ground pads 70. The ring traces 78, which can be formed in the same manner as the traces 50, extend in close proximity to each of the cylinder openings 44, each of the traces 78 providing a suitable base for a continuous bead member 80, the bead member 80 functioning as a counterpart of the button members 74 (grounding the electrodes 46 to the engine 10 as described above), and also providing a durable and effective seal between the substrate 58 and the cylinder assembly 12 or the head 24. Preferably each of the openings 44 has a pair of the ring traces 78 and corresponding bead members 80 for sealing opposite sides of the substrate 58. In this configuration, the outside layers 72 provide sealing for conventional water and/or oil passages and the like, in addition to providing enhanced electrical isolation for the traces $50_{A-D}$. Typically, the bead members 80 are approximately flush with the outside layers 72, preferably protruding slightly as shown in FIG. 5. In this preferred configuration, the bead members 80 are flattened slightly by the clamping between the cylinder assembly 12 and the head 24, promoting an effective seal of the substrate 58 against combustion pressures. A suitable material for the bead members 80 is believed to be solder or other alloy of lead or tin.

With further reference to FIG. 6, an alternative configuration of the module 38 of FIG. 6 has the ring traces 78 and the bead members 80 electrically isolated from the ground electrodes 46, for permitting the ground trace $50_G$ to be separately grounded from the cylinder assembly 12 and the head 24. For this purpose, the ring trace 78 passes between the ground pad 70 for each of the ground electrodes 46 and the associated cylinder opening 44, the ground trace $50_G$ connecting the ground pads 70.

As further shown in FIG. 6, the electrodes 42 are preferably formed integrally with the associated conductor traces 50 of the circuit layer $60_A$. For this purpose, the first substrate layer 62 can temporarily extend within the openings 44 for supporting the electrodes 42 during formation thereof as indicated at 82 in FIG. 6. Once the electrodes 42 are formed, such as in a printed circuit process described above, the temporary extension 82 would be removed, such as by machining. A protective conductive coating 84 is applied to each of the electrodes 42 within the openings 44, such as by electro plating. Suitable materials for the conductive coating 84 include nickel and platinum, which are able to withstand the high temperatures of combustion within the engine 10. Preferably the outside layers 72 are applied subsequent to the conductive coating 84 for protectively covering the extremities of the coating 84 adjacent to the substrate 58.

The foil conductors of the present invention advantageously permit the circuit module 38 to be made very thin. For example, operational prototypes of the module 38 have been made and tested, the substrate 58 having a total thickness of approximately 0.06 inch. It is believed that significant reductions in thickness are also possible.

With further reference to FIG. 7, the head 24 can be configured without spark plug openings into the combustion chambers 26 as shown if FIG. 1, or with such openings as indicated at 86, the head having the openings 86 being designated 24' in FIG. 7. In the configuration of FIG. 1, the head 24 is advantageously simplified by the absence of the plug openings 86, facilitating low cost production thereof. More importantly, the absence of the openings 86 promotes improved heat transfer from the combustion chambers 26, and typically permits enlargement of the ports 28 and 36 as well as the valves 32 and 34 for increased volumetric efficiency of the engine 10. In the configuration of FIG. 7, conventional spark plugs (not shown) can be left installed in the head 24'. Preferably however, the plug openings 86 are sealingly closed by solid plug members 88, for avoiding spark plug fracture and/or potential hot spots within the combustion chambers 26.

With further reference to FIG. 8, the conventional spark plug openings 86 of the head 24' can be advantageously utilized for mounting an injector assembly 90 that projects into the associated combustion chamber 26. As shown in FIG. 8, the injector assembly includes a main injector 92 for injecting fuel directly into the combustion chamber 26, the timing of the injection not being limited by the operation of the valves 32 and 34. The main injector 92 is not described in detail in that such devices are known to those skilled in the art. The present invention, however, provides the advantages of direct fuel injection to be available in conventionally configured spark-ignition engines upon replacement of the spark plugs by the circuit module 38, described above. Further, the injector assembly preferably includes an auxiliary injector 94 for injecting an auxiliary fluid into the combustion chamber 26. The auxiliary fluid can include water, which is known to provide cooler running and reduced likelihood of pre-ignition or detonation (knocking) in typical applications. The auxiliary fluid can also include a nitrogen oxide, which is known to reduce exhaust pollution. Further, the injector assembly 90 can incorporate a strain sensor 96 for feeding a strain signal 98 to a control system 100, the control system 100 automatically adjusting operation of the distributor 22 and/or the fuel feed means 30, for example, in response to sensed pressure loadings within the combustion chamber 26. Typically, the control system 100 would be used for avoiding detonation and/or pre-ignition by fuel mixture enrichment, for example. Moreover, the injector assembly 98 can include an ultrasonic transducer 102 for operation by a suitable power oscillator 104, improved combustion efficiency and reduced exhaust pollution being effected by the projection of ultrasonic radiation into the combustion chamber 26.

Although the present invention has been described in considerable detail with reference to certain preferred versions thereof, other versions are possible. For example, at least some of the pairs of the electrode members 42 associated with one of the combustion chambers 26 can be connected in series. Also, separate conductor traces 50 can be connected to subsets of the hot electrodes 48 of one cylinder 16 for providing a staggered spark interval. Further, the at least some of the foil conductor traces 50 can be formed by stamping from a foil sheet. Therefore, the spirit and scope of the appended claims should not necessarily be limited to the description of the preferred versions contained herein.

What is claimed is:

1. An internal combustion engine comprising:
   (a) cylinder means having at least one piston movable therein;
   (b) head means forming a combustion chamber in fluid communication with the piston, the head means being removably connected to the cylinder means;
   (c) gas flow control means whereby intake air is admitted into the combustion chamber for compression by the piston and subsequently expelled from the combustion chamber as exhaust gas by the piston;
   (d) fuel flow means for controllably admitting fuel into the combustion chamber, the fuel being mixed with the intake air;
   (e) pulse means for generating a high voltage intermittent electric signal, the signal being synchronized with movement of the piston; and
   (f) a planar circuit module clampingly located between the cylinder means and the head means, the module comprising:
      (i) an electrically insulative substrate;
      (ii) a pair of electrode members;
      (iii) circuit means providing a plurality of foil conductor members on the substrate for connecting the electrode members to the pulse means for producing spark ignition of the fuel within the combustion chamber;
      (iv) first seal means for sealingly connecting the substrate to one of the cylinder means and the head means; and
      (v) second seal means for sealingly connecting the substrate to the other of the cylinder means and the head means.

2. The engine of claim 1, further comprising a plurality of the pairs of electrode members of the circuit module.

3. The engine of claim 2, wherein each pair of the electrode members comprises a first electrode member and a second electrode member, the first and second electrode members being located in a plane.

4. The engine of claim 3, wherein the conductor members form at least one circuit layer of the circuit module, the circuit means further comprising an insulating material for electrically isolating at least one of the first and second electrode members from the cylinder means and the head means.

5. The engine of claim 4, wherein the electrode members are formed integrally with the conductor members.

6. The engine of claim 5, wherein the insulative substrate is formed with an opening therein between the combustion chamber and the piston, the electrode members being supportively connected to the substrate and extending into the opening.

7. The engine of claim 6, further comprising a plated conductive coating on the electrodes, the conductive coating substantially covering the portions of the electrodes that extend into the opening.

8. The engine of claim 7, wherein the conductive coating comprises nickel.

9. The engine of claim 7, wherein the conductive coating comprises platinum.

10. The engine of claim 2, wherein the cylinder means includes a plurality of pistons in corresponding cylinders and the head means includes a corresponding plurality of combustion chambers, the circuit module including a plurality of the pairs of electrode members in association with each of the combustion chambers.

11. The engine of claim 10, wherein at least one electrode of each pair of the electrodes associated with any cylinder is electrically isolated from the electrodes of the other cylinders.

12. The engine of claim 2, wherein at least some of the electrode pairs associated with one of the combustion chambers are connected in parallel.

13. The engine of claim 1, wherein the insulative substrate is formed with an opening therein between the combustion chamber and the piston, the electrode members being supportively connected to the substrate and extending into the opening.

14. The engine of claim 1, including means for electrically connecting one of the electrodes to at least one of the cylinder means and the head means by the clamped location of the circuit module therebetween.

15. The engine of claim 1, wherein the first seal means comprises an insulative coating.

16. The engine of claim 15, wherein the insulative coating comprises fibrous ceramic.

17. The engine of claim 15, wherein the first seal means further comprises a metallic ring member rigidly and sealingly connected to the substrate, the ring member being deformed by the clamping between the cylinder means and the head means.

18. The engine of claim 17, wherein the ring member comprises a trace portion and a bead portion, the trace portion being formed as a circuit layer portion of the circuit module, the trace portion providing a base for the bead portion.

19. The engine of claim 1, wherein the engine further comprises a plug opening into the combustion chamber from outside the head means of the type for receiving a spark plug, and a plug member sealingly closing the plug opening.

20. The engine of claim 19, wherein the plug member comprises main injector means for feeding the fuel into the combustion chamber.

21. The engine of claim 19, wherein the plug member comprises auxiliary injector means for feeding an auxiliary fluid into the combustion chamber.

22. The engine of claim 19, wherein the plug member comprises strain sensor means for providing a strain signal, the strain signal being indicative of fluid pressure within the combustion chamber.

23. A kit for replacing spark plugs in an internal combustion engine, the engine including a cylinder assembly having at least one piston movable therein, a head assembly removably connected to the cylinder assembly and forming a combustion chamber in fluid communication with the piston, a gas flow controller admitting intake air into the combustion chamber for compression by the piston and subsequently expelling the air from the combustion chamber as exhaust gas by the piston, a fuel flow controller for admitting fuel mixed with the intake air into the combustion chamber, and a pulser for generating a high voltage intermittent electric signal synchronized with movement of the piston, the kit comprising one plug member for sealingly replacing each spark plug of the engine, and a planar circuit module for clamping between the cylinder assembly and the head assembly, the module comprising:
 (a) an electrically insulative substrate;
 (b) a pair of electrode members;
 (c) circuit means providing a plurality of foil conductor members on the substrate for connecting the electrode members to the pulser for producing spark ignition of the fuel within the combustion chamber;
 (d) first seal means for sealingly connecting the substrate to one of the cylinder assembly and the head assembly; and
 (e) second seal means for sealingly connecting the substrate to the other of the cylinder assembly and the head assembly.

24. The kit of claim 23, further comprising a plurality of the pairs of electrode members of the circuit module.

25. The kit of claim 24, wherein each pair of the electrode members comprises a first electrode member and a second electrode member, the first and second electrode members being located in a plane.

26. The kit of claim 25, wherein the conductor members form at least one circuit layer of the circuit module, the circuit means further comprising an insulating material for electrically isolating at least one of the first and second electrode members from the cylinder assembly and the head assembly.

27. The kit of claim 24, wherein the cylinder assembly includes a plurality of pistons and the head assembly includes a corresponding plurality of combustion chambers, the circuit module including a plurality of the pairs of electrode members in association with each of the combustion chambers.

28. The kit of claim 24, wherein at least some of the electrode pairs associated with one of the combustion chamber are connected in parallel.

29. The kit of claim 23, wherein the insulative substrate is formed with an opening therein between the combustion chamber and the piston, the electrode members being supportively connected to the substrate and extending into the opening.

30. The kit of claim 23, wherein the first seal means comprises an insulative coating and a metallic ring member rigidly and sealingly connected to the substrate, the ring member being deformed by the clamping between the cylinder means and the head means.

31. The kit of claim 30, wherein the ring member comprises a trace portion and a bead portion, the trace portion being formed as a circuit layer portion of the circuit module, the trace portion providing a base for the bead portion.

32. An internal combustion engine comprising:
 (a) cylinder means having a plurality of pistons movable in corresponding cylinders thereof;
 (b) head means forming a plurality of combustion chambers in fluid communication with the pistons, the head means being removably connected to the cylinder means;
 (c) gas flow control means whereby intake air is admitted into the combustion chambers for compression by the pistons and subsequently expelled from the combustion chambers as exhaust gas by the pistons;
 (d) fuel flow means for controllably admitting fuel into the combustion chambers, the fuel being mixed with the intake air;
 (e) pulse means for generating a high voltage intermittent electric signal, the signal being synchronized with movement of the pistons; and
 (f) a planar circuit module clampingly located between the cylinder means and the head means, the module comprising:
  (i) an electrically insulative substrate formed with a plurality of openings therein between the combustion chambers and the pistons;
  (ii) a plurality of pairs of electrode members in association with each of the combustion chambers, each pair of electrode members comprising a first electrode member and a second electrode member, the electrode members being in a plane and supportively connected to the substrate and extending into the opening;
  (iii) circuit means on the substrate for connecting the electrode members to the pulse means for producing spark ignition of the fuel within the combustion chambers, the circuit means comprising a plurality of foil conductor members, the conductor members forming a circuit layer of the circuit module, the circuit means further comprising an insulating material for electrically isolating at least one of the first and second electrode members from the cylinder means and the head means, at least one electrode of each pair of the electrodes associated with any cylinder being electrically isolated from the electrodes of the other cylinders;

(iv) first seal means for sealingly connecting the substrate to one of the cylinder means and the head means, the first seal means comprising an insulative coating and a metallic ring member rigidly and sealingly connected to the substrate, the ring member being deformed by the clamping between the cylinder means and the head means, the ring member comprising a trace portion and a bead portion, the trace portion being formed as a circuit layer portion of the circuit module, the trace portion providing a base for the bead portion; and (v) second seal means for sealingly connecting the substrate to the other of the cylinder means and the head means.

* * * * *